United States Patent [19]

Schneider et al.

[11] Patent Number: 4,957,398
[45] Date of Patent: Sep. 18, 1990

[54] TWO-SECTION TOOL SPINDLE HAVING A CHANNEL FOR CARRYING PRESSURIZED FLUID

[75] Inventors: Manfred Schneider, Grossbottwar; Bernd Driesner, Penzberg; Joerg Luetzkendorf, Ludwigsburg, all of Fed. Rep. of Germany

[73] Assignee: Friedrich Deckel Aktiengesellschaft, Munich, Fed. Rep. of Germany

[21] Appl. No.: 187,159

[22] Filed: Apr. 28, 1988

[30] Foreign Application Priority Data

Apr. 30, 1987 [DE] Fed. Rep. of Germany ....... 3714562

[51] Int. Cl.⁵ .......................... B23C 5/10; B23C 11/10
[52] U.S. Cl. ...................................... 409/136; 408/56; 408/124; 409/233
[58] Field of Search ...................... 408/56, 124, 97, 60, 408/61; 409/135, 136, 231-233

[56] References Cited

U.S. PATENT DOCUMENTS

| | | | |
|---|---|---|---|
| Re. 26,623 | 7/1969 | Erikson | 409/136 |
| 3,135,071 | 6/1964 | Godar | 51/166 |
| 4,131,054 | 12/1978 | Johnson et al. | 409/233 |
| 4,167,218 | 9/1979 | Horiuchi et al. | 409/233 X |
| 4,242,019 | 12/1980 | Roch | 409/233 X |
| 4,583,894 | 4/1986 | Mitchell | 409/233 |

FOREIGN PATENT DOCUMENTS

| | | |
|---|---|---|
| 2711238 | 9/1978 | Fed. Rep. of Germany . |
| 2928912 | 1/1981 | Fed. Rep. of Germany . |
| 3423060 | 1/1986 | Fed. Rep. of Germany ...... 409/233 |
| 243461 | 3/1987 | Fed. Rep. of Germany . |
| 2147763 | 3/1973 | France . |
| 2481633 | 11/1981 | France . |
| 60-118407 | 6/1985 | Japan ..................................... 408/56 |

OTHER PUBLICATIONS

English language abstract of Japanese Patent No. 196 103, dated Nov. 7, 1984 (1 page).

Primary Examiner—Steven C. Bishop
Attorney, Agent, or Firm—Flynn, Thiel, Boutell & Tanis

[57] ABSTRACT

The invention relates to a tool-spindle arrangement comprising a main spindle rotatably supported in a spindle housing and an electrical drive motor drivingly connected to the main spindle. The main spindle is constructed hollow to receive operating elements of the spindle arrangement. It is suggested that the motor shaft of the electrical drive motor itself is constructed as a main spindle.

The main spindle is part of the drive motor. It is preferably constructed in two parts, namely, a spindle section and a motor-shaft section which, when connecting the drive motor to the machine, are coupled with one another. The motor-shaft section is also constructed hollow to receive operating elements, for example clamping members for chucking of the tool, air-blast pipes, cooling-medium pipes, etc.

5 Claims, 1 Drawing Sheet

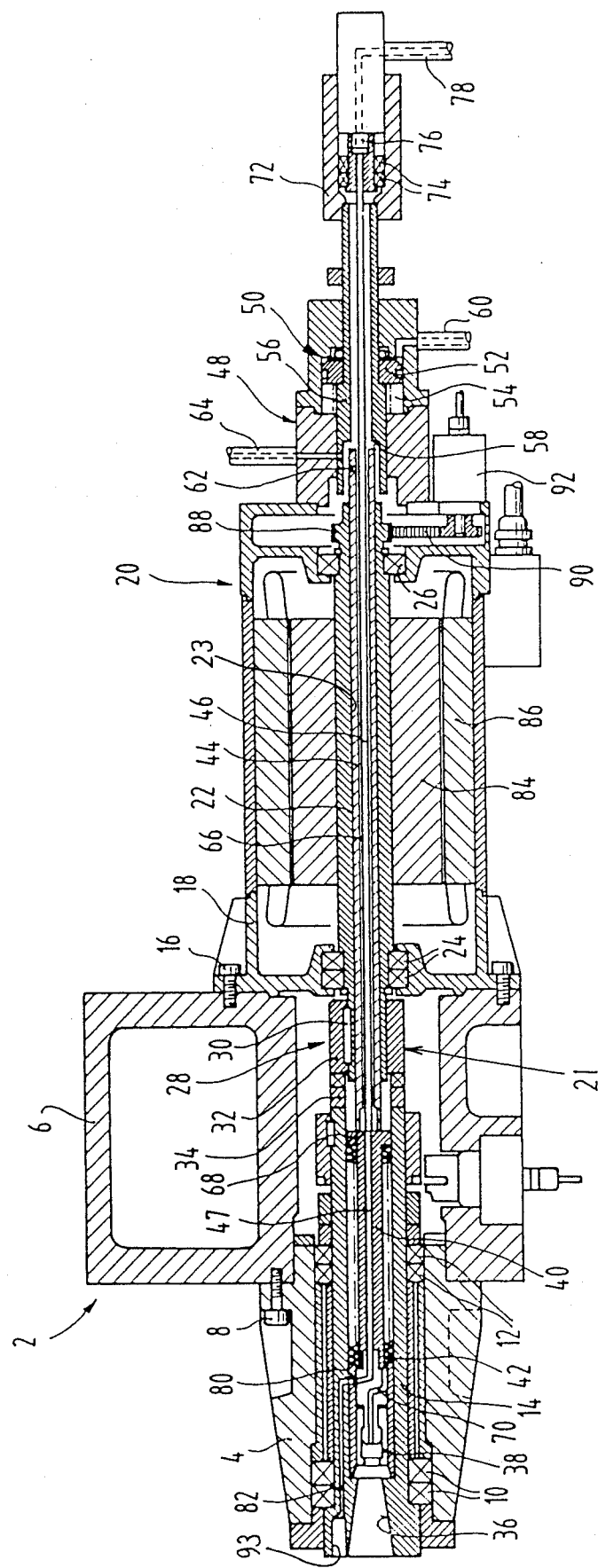

TWO-SECTION TOOL SPINDLE HAVING A CHANNEL FOR CARRYING PRESSURIZED FLUID

FIELD OF THE INVENTION

The invention relates to a tool-spindle arrangement driven by an electric motor.

BACKGROUND OF THE INVENTION

Such tool-spindle arrangements are common in modern day machine tool construction. Such spindle arrangements are generally driven through a tooth system provided directly on the outside of the spindle or a gear arranged fixed against rotation on the spindle and a drive pinion cooperating therewith and connected through gears to a drive motor and, if necessary, connected after the drive motor. The drive motor—and, if necessary, the gear—are provided radially next to the tool spindle, so that generally a large and interfering size of construction results. To arrange the drive motor and a gear connected thereto as an axial extension of the spindle on its rearward end is generally not possible, since devices of the operating elements arranged inside of the hollow main spindle, for example tool vices, discharge-air pipes etc., are provided in this area.

A further disadvantage that exists with the known tool-spindle arrangements is that in every case, even if the drive motor is speed-controlled and a gear is not needed, a torque transmission through a tooth-system pairing takes place, which, as is known, results in the generation of noise and heat and requires a lubrication.

One purpose of the present invention is to provide a tool-spindle arrangement driven by an electric motor which requires little expense in its construction and in which a power transmission through gear pairings is avoided.

Another purpose of the invention is to provide a two-section tool spindle having a hollow spindle section connected at an axial end thereof to an axial end of a motor shaft section, wherein the motor shaft section includes a pressurized fluid carrying channel to facilitate supplying pressurized fluid to a tool receiving end of the spindle section.

The motor shaft of the electrical drive motor is itself constructed as a main spindle with all related operating components. The radial construction dimensions of the entire arrangement can in this manner be reduced to a minimum, namely the outer circumference of the drive motor itself. Any type of power transmission by a gear pairing is not needed and, thus, any type of noise and heat generation and the necessity for lubrication do not occur. The rear end part of the spindle remains free for the arrangement of the operating devices for operating the operating elements arranged inside of the drive spindle.

When the tool spindle is driven at one single speed, then an electric motor having a fixed operating speed is sufficient as a drive motor. However, in a preferred embodiment of the invention, the speed of the drive motor is adjustable with respect to its number of rotations per given time unit.

The main spindle is generally manufactured by the manufacturer of the machine tool, while the drive motor and thus also the motor shaft are supplier supplied parts. Therefore, one embodiment of the present invention provides that the main spindle includes of a front spindle section lying outside of the drive motor and a motor-shaft section coaxial thereto and lying substantially inside of the drive motor and which can be connected rotationally to the spindle section. Both sections are conformed structurally exactly to one another, for example with respect to their outside dimensions and the inside space. The spindle section is supported preferably in a separate spindle housing, the motor-shaft section in a motor housing. During the installation of the machine tool, the motor housing is secured on the spindle housing and at the same time the motor-shaft section, which is accessible at its two shaft ends, is coupled with the spindle section. Operating elements of the spindle arrangement, which operating elements are arranged inside of the spindle section, are at the same time coupled with corresponding operating elements arranged in the motor-shaft section, as will be discussed in greater detail in connection with on exemplary embodiment described below.

The drive motor is constructed in a preferred embodiment of the invention as a so called inner motor having an inner rotor arranged directly on the motor-shaft section and a stator arranged in the motor housing and enveloping the rotor.

Further developments of the invention result from the description of one exemplary embodiment. Such an exemplary embodiment is illustrated in the drawing and will be discussed in greater detail hereinbelow.

BRIEF DESCRIPTION OF THE DRAWINGS

The figure in the drawing shows a longitudinal crosssectional view of a tool-spindle arrangement having a front spindle section and a rear motor-shaft section coupled with the front spindle section.

DETAILED DESCRIPTION

The spindle housing 2 illustrated in the drawing consists of a front housing part 4 and a rear housing part 6, which are secured together by means of screws 8. The front spindle section 14 is rotatably supported by bearings 10 and 12 in the spindle housing 2.

The motor housing 18 of an electrical drive motor 20 is secured by means of the screws 16 to the rear housing part 6 of the spindle housing 2. A motor-shaft section 22 is rotatably supported by bearings 24 and 26 in the motor housing 18. The motor-shaft section 22 is rotationally connected to the front spindle section 14 by the coupling structure 28. The front spindle section 14 and the motor shaft section 22 form a composite main spindle 21. The coupling structure includes a dog clutch 32 arranged on the motor-shaft section 22 and rotationally connected thereto by a driving key 30. The dog clutch 32 engages dogs 34 provided on and at the rear end of the spindle section 14. This is actually known and, therefore, not described in greater detail.

A conical tool-receiving opening 36 is provided at the front end of the spindle section 14, which front end is located at the left side of the drawing. Tools having conically shaped shanks can be inserted into the tool-receiving opening 36. A conventional, axially movable collet 38 is arranged in the spindle section 14, through which collet the tool can be pulled into the tool-receiving opening 36. The collet 38 is connected to a spreader bar 40 which is loaded in a tensioning direction by a cup-spring package 42; the drawing illustrates that the tool is clamped or chucked into the opening 36 by a movement of the spreader bar 40 to the right, whereas it is released and ejected by a movement to the left.

An axially movable, hollow operating rod 44 is arranged in an axially extending bore 23 of the motor-shaft section 22 such that the motor shaft section 22 is sleeved thereon. A pipe 46 is provided inside of the operating rod. The operating rod 44 is connected, with its end facing the spreader bar 40, to the spreader bar. The end of the pipe 46 facing the spreader bar 40 is externally threaded and is threadedly coupled into an internally threaded receiving bore 47 provided in the spreader bar which bore 47 defines an extension of a center cooling-medium channel in the spreader bar 40. Since the spreader bar 40 rotates together with the spindle section 14, the operating rod 44 and the pipe 46 rotate also around the spindle axis.

The end of the operating rod 44, in the drawing the right end, projects beyond the motor-shaft section 22 and into a housing part 48, which houses hydraulic responsive structure 50 for the axial movement of the operating rod 44. The hydraulic responsive structure 50 includes a hydraulic piston 52 arranged movably in a cylinder 54. The piston 52 itself is connected to an operating sleeve 56 movably arranged in the housing part 48. The operating sleeve 56 has a shoulder 58 which is opposite the right end of the operating rod 44. A pressure fluid can be supplied to the cylinder 54 through a hydraulic pipe 60. The piston 52 is moved by the pressure fluid to the left in the drawing. The shoulder 58 thereby comes to rest on the operating rod 44, which is also moved to the left. The operating rod 44 operates the spreader bar 40 against the force of the cup-spring package 42 and releases thereby in a conventional manner the collet 38. When the hydraulic pipe 60 is connected to the return, the collet 38, the operating rod 44, the operating sleeve 56 and the piston 52 are moved back again into the right initial position by the cup-spring package 42 and a tool provided in the tool-receiving opening 36 is clamped.

The pipe 46 is arranged with sufficient clearance 66 inside the operating rod 44 so as to define an annular space in the bore 23. The annular space or chamber 66 formed between the pipe 46 and the operating rod 44 is on its side, which in the drawing is the right side, open toward the inside of the housing part 48 and is additionally connected to it through a connecting bore 62. Compressed air can be fed through a compressed-air pipe 64 to the inside of the housing part 48 and thus to the annular chamber 66 surrounding the pipe 46. The annular chamber 66 is at its end, which in the drawing is the left end, connected through a connecting bore 68 to the annular chamber housing the cup-spring package 42 therein. The annular chamber in turn ends in a further, bent connecting bore 70 that extends into the tool-receiving opening 36. The tool-receiving opening 36 can in this manner be blown free of dirt.

The right end of the pipe 46 extends beyond the end of the operating rod 44 into a housing part 72, which housing part is secured to the right end of the operating sleeve 56. Since the pipe 46 rotates with the spindle, it is supported through bearings 74 in the housing part 72. The right end of the pipe 46 is connected in a conventional manner through a rotary connection 76 to a cooling-medium pipe 78. The supplied cooling medium moves through the pipe 46 and the center bore 47 provided in the spreader bar 40 and the channel sections 80, 82 following thereafter to an opening 93 in the face (left end surface) of the spindle section 14 and from there in a conventional manner into cooling-medium channels of tools inserted into the tool-receiving opening 36.

The drawing will further facilitate a recognition that the drive motor 20 is constructed as an inner rotor motor. The rotor 84 is directly connected to the motor-shaft section 22. The stator 86 is fixedly arranged in the motor housing 18.

A tooth system 88 is provided at the right end of the motor-shaft section 22, which tooth system 88 is connected through a toothed belt 90 to a rotation transmitter 92 which, in a conventional manner, delivers information about the operation of the drive motor 20 to a control device.

The embodiments of the invention in which an exclusive property or privilege is claimed are defined as follows:

1. A two-section tool spindle apparatus, comprising:
   a spindle housing;
   a two-section main tool spindle and a drive motor therefor, said two-section main tool spindle including a hollow spindle section and a motor shaft section, said spindle section being rotatably supported in said spindle housing for rotation about a rotational axis, said hollow spindle section and said motor shaft section being distinct and separate parts of said main tool spindle, said motor shaft section including means for rendering said motor shaft section an integral part of said drive motor, said main tool spindle further including coupling means for coupling one axial end of said motor shaft section to one axial end of said hollow spindle section such that said motor shaft section and said hollow spindle section are coaxially aligned and rotationally fast, said hollow spindle section including means defining a tool receiving opening therein at an axial end thereof opposite said one axial end thereof;
   a spreader bar axially movably disposed in said hollow spindle section and for rotation therewith, said spreader bar including means for releasably gripping a tool in said tool receiving opening and for facilitating a rotation thereof with said main tool spindle, said spreader bar having means defining an axially extending bore therethrough, said spreader bar being spaced radially inwardly from an inner peripheral surface of said hollow spindle section to define an axially extending first annular chamber radially between said spreader bar and said inner peripheral surface of said hollow spindle section, said first annular chamber having spring means provided therein for urging said spreader bar axially away from said tool receiving opening;
   means defining an axially extending bore through said motor shaft section, said motor shaft section including an axially extending hollow operating rod supported axially movably in said motor shaft section bore, said operating rod projecting axially beyond both axial ends of said motor shaft section, said operating rod having an axial end which is adjacent an axial end of said spreader bar, means for connecting said operating rod and said spreader bar at said adjacent axial ends thereof so that section in response to axial movement of said operating rod and said spreader bar will be axially movable in said hollow spindle section in response to axial movement of said operating rod and against said spring means toward said tool receiving opening, said motor shaft section further including an axially extending pipe disposed radially inside said hollow operating rod for conveying cooling medium therethrough;

said pipe having an axial end which is adjacent said axial end of said spreader bar, said main tool spindle including means for coupling said axial end of said pipe to said bore in said spreader bar such that said pipe is in fluid communication with said bore in said spreader bar, said pipe and said hollow operating rod being radially spaced from each other to define an axially extending second annular chamber radially therebetween;

said tool receiving opening end of said hollow spindle section including an axially facing end surface adjacent and surrounding said tool receiving opening, and means defining an auxiliary opening in said end surface adjacent said tool receiving opening;

said hollow spindle section including means for providing fluid communication between said spreader bar bore and said auxiliary opening, whereby said pipe is placed in fluid communication with said auxiliary opening; and means for providing fluid communication between said first annular chamber and said tool receiving opening, and means for providing fluid communication between said first annular chamber and said second annular chamber, whereby said second annular chamber is placed in fluid communication with said tool receiving opening.

2. The apparatus according to claim 1, including supply means for supplying compressed air and a pressurized cooling medium to said second annular chamber and said pipe, respectively.

3. The apparatus according to claim 2, wherein said motor housing is secured to said spindle housing at a side thereof adjacent said one axial end of said spindle section.

4. The apparatus according to claim 3, wherein said pipe is arranged coaxially with said hollow operating rod, and wherein said drive motor includes an inner rotor arranged directly on said motor shaft section and a stator arranged in said drive motor housing and surrounding said rotor.

5. The apparatus according to claim 4, including rotation transmitter means for determining a rotational rate of said drive motor, and means provided at an end of said motor shaft section opposite said one end thereof for operatively connecting said rotation transmitter means to said drive motor.

* * * * *

UNITED STATES PATENT AND TRADEMARK OFFICE
CERTIFICATE OF CORRECTION

PATENT NO. : 4 957 398
DATED : September 18, 1990
INVENTOR(S) : Manfred SCHNEIDER et al.

It is certified that error appears in the above-identified patent and that said Letters Patent is hereby corrected as shown below:

Column 4, line 61; delete "sec-".
line 62; delete in its entirety.
line 63; delete "ing rod and".

Signed and Sealed this

Twenty-third Day of June, 1992

Attest:

DOUGLAS B. COMER

Attesting Officer     Acting Commissioner of Patents and Trademarks